United States Patent [19]
Tanaka et al.

[11] Patent Number: 5,644,929
[45] Date of Patent: Jul. 8, 1997

[54] HEAT REGENERATING TYPE COOLING APPARATUS

[75] Inventors: Hisashi Tanaka; Yuichi Shirota; Hikaru Sugi; Masami Konaka; Kazushi Yamamoto; Seiji Miwa; Manabu Miyata, all of Kariya, Japan

[73] Assignee: Nippondenso Co., Ltd., Kariya, Japan

[21] Appl. No.: 573,276

[22] Filed: Dec. 15, 1995

[30] Foreign Application Priority Data

Dec. 16, 1994 [JP] Japan .................................. 6-313187
Dec. 16, 1994 [JP] Japan .................................. 6-313621
Sep. 13, 1995 [JP] Japan .................................. 7-235504

[51] Int. Cl.$^6$ ..................................................... F25D 17/04
[52] U.S. Cl. ................................................ 62/406; 62/434
[58] Field of Search .......................... 62/244, 406, 430, 62/434, 439

[56] References Cited

FOREIGN PATENT DOCUMENTS 62-149509  7/1987  Japan .

*Primary Examiner*—William Doerrler
*Attorney, Agent, or Firm*—Cushman, Darby & Cushman IP Group of Pillsbury Madison & Sutro LLP

[57] ABSTRACT

A heat regenerating type cooling apparatus includes a heat regenerating evaporator encased in a case and provided with a tube for a cooling medium and a heat regenerating pack arranged to be in close contact with the outer surface of the tube of the heat regenerating evaporator. The heat regenerating evaporator conducts a refrigeration cycle while a vehicle is running and cools the heat regenerating pack so as to cause a heat regenerating material within the pack to freeze When the vehicle is parked, a blower is operated to cause a current of air that is cooled by the heat regenerating pack due to heat exchange between the current of air and the frozen heat regenerating material in the heat regenerating pack. The cold air is blown out into an objective cooling area, such as a sleeping area of the vehicle, from a blowing port so that the objective cooling area is air-conditioned, and the upper half of the body of a sleeping person in the area is effectively exposed to air-conditioned air.

61 Claims, 9 Drawing Sheets

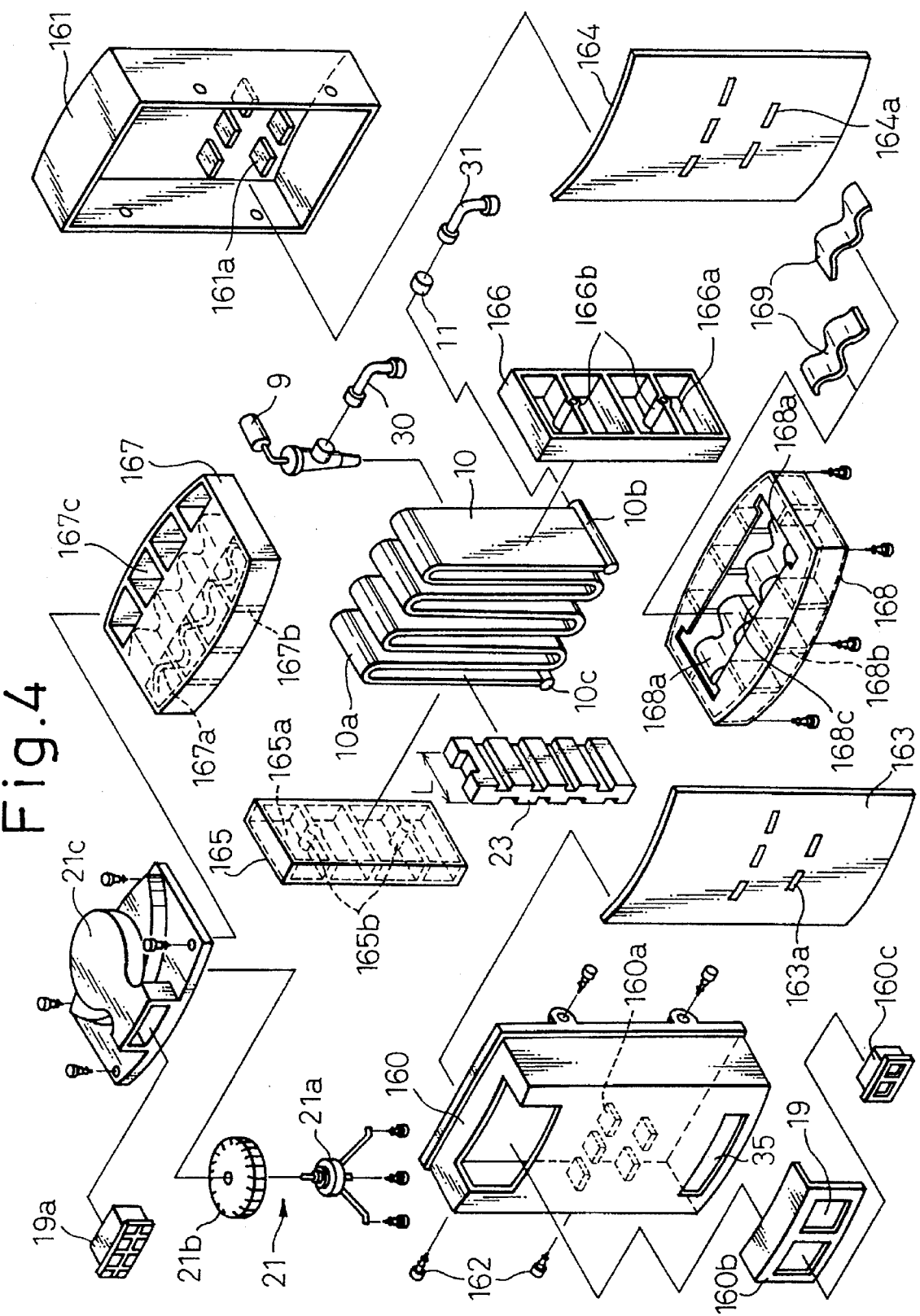

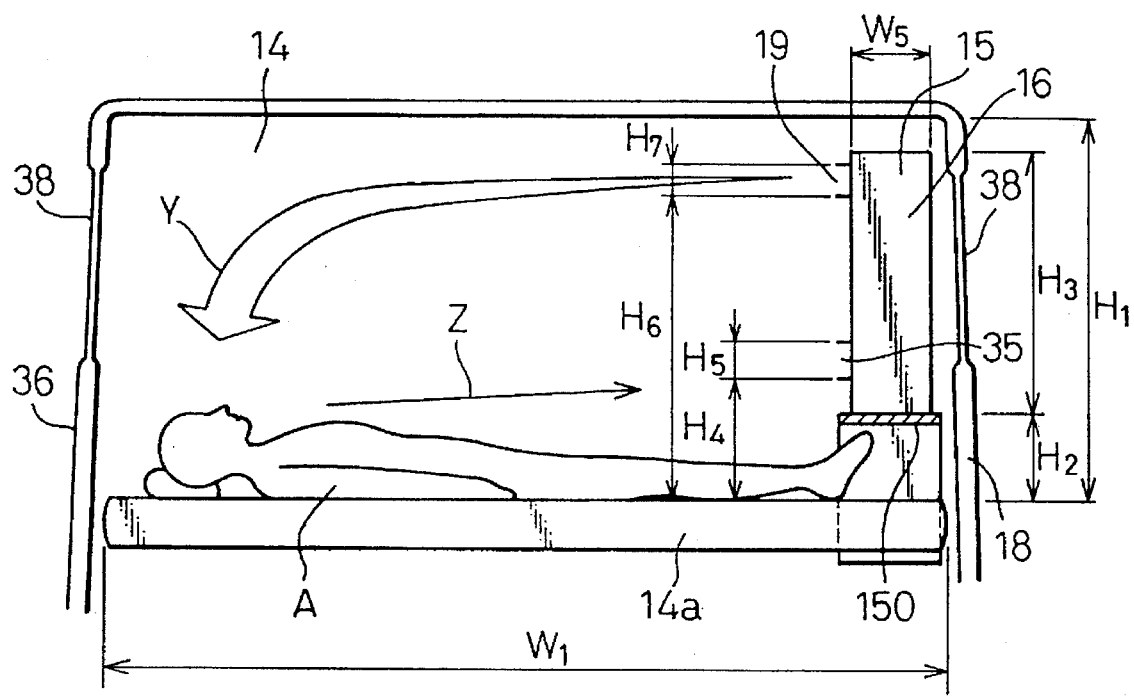

HEAT REGENERATING TYPE COOLING APPARATUS

BACKGROUND OF THE INVENTION

1. Field of the Invention

The present invention relates to a heat regenerating type cooling apparatus by which a room is air-conditioned using the latent heat of fusion of a heat regenerating material. Particularly, the present invention relates to a heat regenerating type cooling apparatus suitable for air-conditioning a sleeping area in a vehicle, for example, a truck.

2. Description of the Related Art

The conventional heat regenerating type cooling apparatus used for air-conditioning a sleeping area of a vehicle is disclosed in Japanese Unexamined Patent Publication (Kokai) No. 62-149509. The above conventional cooling apparatus is composed as follows. There is formed a sleeping area at the rear of a truck driver's cabin. A cooling unit is mounted on a rear wall of this sleeping area. An air suction port is provided at a lower portion of the cooling unit case, and an air outlet is provided at an upper portion of the case, and further there are provided a heat regenerator and a blower in the case.

The above heat regenerator includes a refrigerant evaporator provided in the refrigerating cycle for air-conditioning, and a heat regenerating material member which is cooled by this evaporator. This heat regenerator is operated as follows. While a truck is running, the heat regenerating material member is cooled and frozen by the action of this refrigerant evaporator. When the truck is stopped and the truck driver sleeps in the sleeping area, the blower of the cooling apparatus is set in motion and a current of air is sent into an air path formed in the heat regenerating material member so that heat can be exchanged between the heat regenerating material member and the air from the blower. The thus cooled air is blown out from an air outlet into the sleeping area.

When the above heat regenerating type cooling apparatus is put into practical use as a product, it is necessary to provide an excellent cooling performance. In order to attain the object, it is required to uniformly send air into the air path formed in the heat regenerating material portion with a low pressure loss. Further, in order to reduce the cooling time and maintain the heat preserving ability, it is necessary to enhance the heat insulating property of the cooling unit.

However, in the above patent publication in which the conventional apparatus is described, the specific means for accomplishing the above object is not disclosed.

SUMMARY OF THE INVENTION

Therefore, it is an object of the present invention to uniformly send air into the air path formed in the heat regenerating material portion.

It is another object of the present invention to provide a heat regenerating type cooling apparatus, the case structure of which has a high heat insulating property.

In accordance with one aspect of the present invention, the present invention provides a heat regenerating type cooling apparatus comprising: a pack-shaped member accommodating heat regenerating material; a heat regenerator having a tube in which refrigerant is circulated, the pack-shaped member being closely contacted with a surface of the tube so as to be cooled by the tube; an air path formed in the pack-shaped member so that heat can be exchanged between air and the pack-shaped member; an air blowing means for blowing air into the air path, wherein cool air cooled by the pack-shaped member is blown out from the air path to an object to be cooled; and a plurality of ribs for guiding air, the ribs being arranged at least in one of the upstream and the downstream of an air current flowing in the pack-shaped member, wherein the plurality of ribs are dispersedly arranged so that the air current flowing toward the pack-shaped member can be uniformly dispersed.

In accordance with one aspect of the present invention, the present invention provides a heat regenerating type cooling apparatus comprising: a pack-shaped member accommodating heat regenerating material; a heat regenerator having a tube in which refrigerant is circulated, the pack-shaped member being closely contacted with a surface of the tube so as to be cooled by the tube; an air path formed in the pack-shaped member so that heat can be exchanged between air and the pack-shaped member; an air blowing means for blowing air into the air path, a case for accommodating the pack-shaped member, a heat regenerator, an air path and an air blowing means; an air suction port arranged on the case, from which a current of air flows into the air path; an air outlet arranged on the case, through which cool air cooled by the pack-shaped member is blown out from the air path to an object to be cooled; and a plurality of ribs for guiding air, the ribs being arranged at least in one of the upstream and the downstream of an air current flowing in the pack-shaped member, wherein the plurality of ribs are dispersedly arranged so that the air current flowing from the air suction port to the pack-shaped member can be uniformly dispersed.

The present invention provides a heat regenerating type cooling apparatus used for air-conditioning a sleeping area of a vehicle in which a vehicle driver can sleep, the heat regenerating type cooling apparatus further comprising: a cooling unit including a cooling means composed of a pack-shaped member accommodating a heat regenerating material member and a heat regenerator, an air blowing means and a case, the cooling unit being arranged on one side wall of the sleeping area with respect to the vehicle width direction; an air suction port for sucking air from the sleeping area, the air suction port being arranged in a lower portion of the cooling unit; and an air blowing port for blowing cool air cooled by the cooling means, to the other side wall of the sleeping area with respect to the vehicle width direction.

The present invention provides a heat regenerating type cooling apparatus, further comprising a stand arranged in a lower portion of one side wall of the sleeping area with respect to the vehicle width direction, wherein the stand defines a space for accommodating an end of a bed and also accommodating the feet of a sleeping person, and the cooling unit is mounted on the stand.

The present invention provides a heat regenerating type cooling apparatus in which the air suction port is formed over the entire width of the front face of the cooling unit, and the air blowing port is formed in a small region of about ⅓ of the width of the front face of the cooling unit.

The present invention provides a heat regenerating type cooling apparatus in which the ribs are arranged in both the upstream and the downstream of air flow with respect to the pack-shaped member.

The present invention provides a heat regenerating type cooling apparatus in which the ribs press at least the pack-shaped member from the pack-shaped member and the tube of the heat regenerator so as to fix the pack-shaped member in the case.

The present invention provides a heat regenerating type cooling apparatus in which the ribs are arranged zigzag with respect to the air path.

The present invention provides a heat regenerating type cooling apparatus in which the case is molded of resin and the ribs are formed integrally with the case.

The present invention provides a heat regenerating type cooling apparatus in which a member forming an insulating air layer is arranged around the heat regenerator.

The present invention provides a heat regenerating type cooling apparatus in which an air purifying filter for purifying the air flowing onto the front side of the pack-shaped member and the heat regenerator is detachably arranged close to the air suction port on the case.

The present invention provides a heat regenerating type cooling apparatus in which the air purifying filter covers the front side of the pack-shaped member and the heat regenerator, and the air purifying filter is detachably attached into the case through a filter insertion hole formed on the side of the case.

The present invention provides a heat regenerating type cooling apparatus in which the case is arranged in a predetermined region in the vehicle's cabin, and the predetermined region is cooled by a current of cool air blowing out from the air blowing port.

BRIEF DESCRIPTION OF THE DRAWINGS

The above and other objects, features, and advantages will be made more apparent from the ensuing description of the preferred embodiments in conjunction with the accompanying drawings wherein:

FIG. 4 is an exploded perspective view of the cooling unit;

FIG. 10 is a side view showing the specific installation structure of the cooling unit 15;

DESCRIPTION OF THE PREFERRED EMBODIMENT

Figure 1:
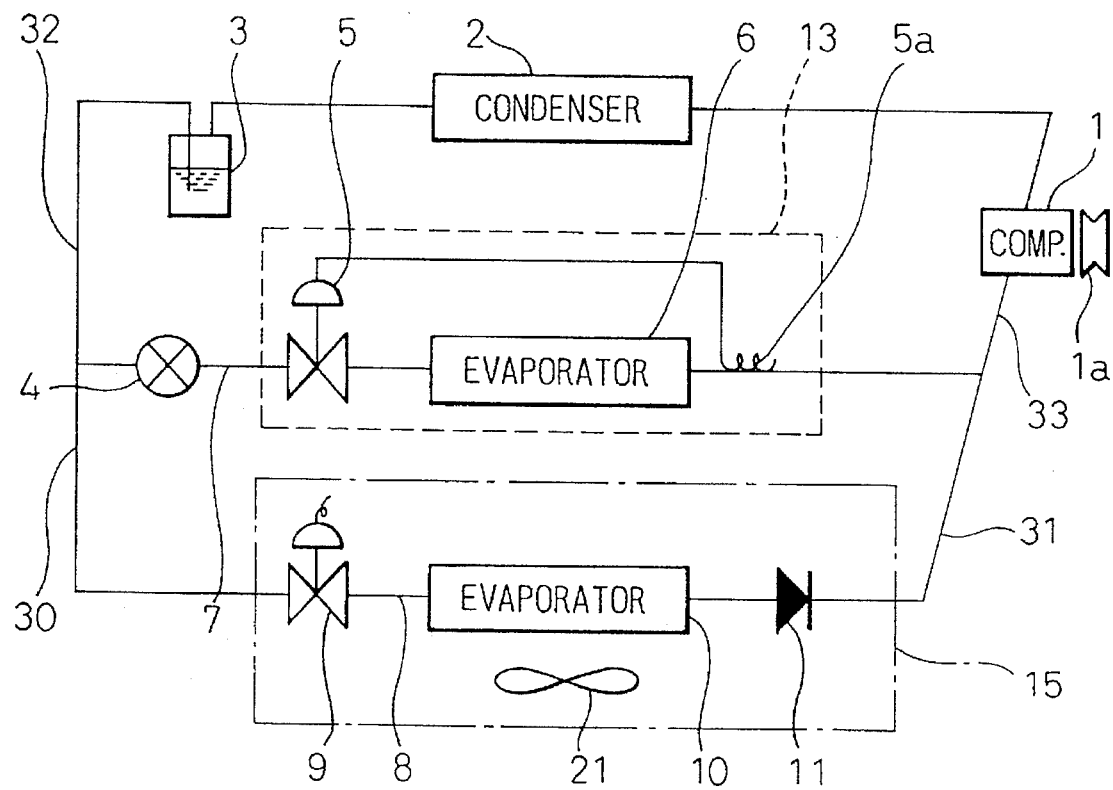
FIG. 1 is a diagram showing a refrigerating system of the first embodiment of the present invention.

Referring to FIG. 1, there is shown a refrigerating system, for the heat regenerating type cooling apparatus used for air-conditioning a sleeping area in a truck, to which the present invention is applied. A compressor 1 is driven by a truck engine (not shown) via an electromagnetic clutch 1a. Reference numeral 2 is a condenser for cooling and condensing refrigerant gas, at high temperature and pressure, discharged from the compressor 1. Reference numeral 3 is a receiver for receiving refrigerant liquid condensed by the condenser 2 so that only refrigerant liquid can be sent out from the receiver.

Reference numeral 4 is an electromagnetic valve, which is normally open, and a flow of refrigerant is switched on and off by this electromagnetic valve. Reference numeral 5 is an expansion valve, operated in accordance with temperature, which is a pressure reducing means for reducing the pressure of refrigerant liquid so that the refrigerant can be expanded. Reference numeral 5a is a temperature detecting element used for the operation of the expansion valve 5. Reference numeral 6 is an evaporator in which the refrigerant is evaporated for air-conditioning a truck driver's cabin. The evaporator 6 is installed in an air-conditioning unit 13 which is arranged in a lower portion of a dashboard 12a disposed in the front portion of the truck driver's cabin 12 (shown in FIG. 2).

A current of air is blown into this air-conditioning unit 13 by a blower not shown in the drawing. This current of air is cooled by the evaporator 6 and sent to a heater unit and an air blowing port. Then the current of air is blown out into the driver's cabin (vehicle cabin) 12 from the air blowing port.

A refrigerant circuit for air-conditioning 7 has units 5, 6 used for air-conditioning the driver's cabin, and the electromagnetic valve 4 stops and starts a flow of refrigerant to the refrigerant circuit 7 for air-conditioning the driver's cabin. Reference numeral 8 is a refrigerant circuit for regenerating heat which is arranged in parallel with the refrigerant circuit 7 for air-conditioning. Reference numeral 9 is a constant pressure expansion valve which is a pressure reducing means for reducing the pressure of refrigerant liquid so that the refrigerant can be expanded. When the pressure downstream of the constant pressure expansion valve 9 is reduced to be lower than a predetermined value, the constant pressure expansion valve 9 is opened.

Reference numeral 10 is an evaporator to evaporate the refrigerant for regenerating heat. This evaporator 10 is used for regenerating heat so that the sleeping area 14 disposed at the rear of the truck driver's cabin 12 can be cooled. The evaporator 10 is installed in the case 16 of the cooling unit 15 arranged in the sleeping area 14. Reference numeral 11 is a check valve, which prevents the refrigerant at high temperature from flowing backward from the evaporator 6 for air-conditioning to the evaporator 10 for generating heat. In this way, the refrigerant is allowed to flow only in one direction from the upstream to the downstream of the evaporator 10 for regenerating heat.

Figure 2:
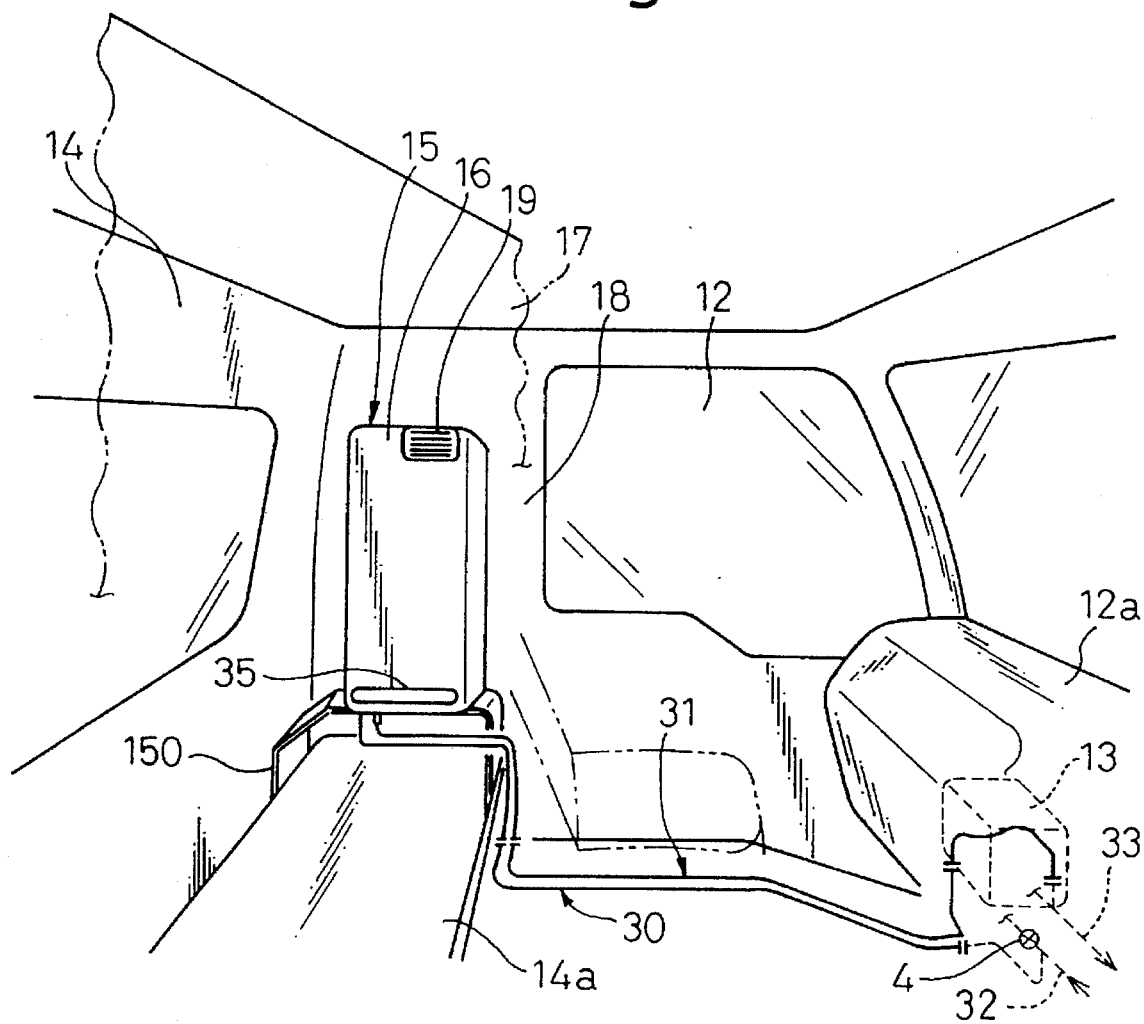
FIG. 2 is a schematic illustration showing an outline of the installation of the cooling unit of the first embodiment.

FIG. 2 is a view showing an embodiment of the apparatus of the present invention which is installed in the sleeping area of the truck driver's cabin. There is formed a sleeping area 14 having a bed 14a at the rear of the truck driver's cabin 12. There is provided a curtain 17 between the sleeping area 14 and the driver's cabin 12 so that the two rooms can be separated.

In the sleeping area 14, there is provided a cooling unit 15 on one side wall 18 with respect to the vehicle width direction.

As illustrated in FIG. 2, this cooling unit 15 includes a thin case 16 made of resin, the length of which is longer than the width, and this thin case 16 is formed into a rectangular parallelepiped. In the front lower portion of the case 16, there is provided a suction port 35 for sucking air from the sleeping area 14. This suction port 35 is formed substantially over the entire width of the front face of the cooling unit case 16.

In the front upper portion of the case 16, there is provided a grid-shaped air blowing port 19 from which a current of cool air is blown out toward the other side wall (not shown) of the sleeping area 14 with respect to the vehicle width direction. The cooling unit 15 is set and fixed onto a gate-shaped stand 150 which straddles the end portion of the bed 14a.

In this connection, in FIGS. 1 and 2, reference numeral 30 is a refrigerant pipe for regenerating heat on the high pressure side, reference numeral 31 is a refrigerant pipe for regenerating heat on the low pressure side, reference numeral 32 is a refrigerant pipe for air-conditioning on the high pressure side, and reference numeral 33 is a refrigerant pipe for air-conditioning on the low pressure side, which is connected to a suction port of the compressor 1.

Figure 3A:
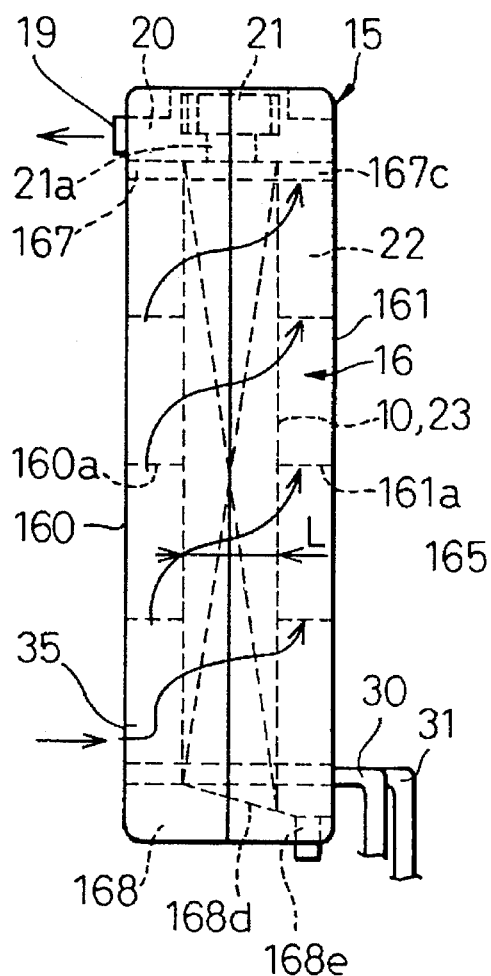
FIG. 3A is a side view of the cooling unit shown in FIG. 2.
Figure 3B:
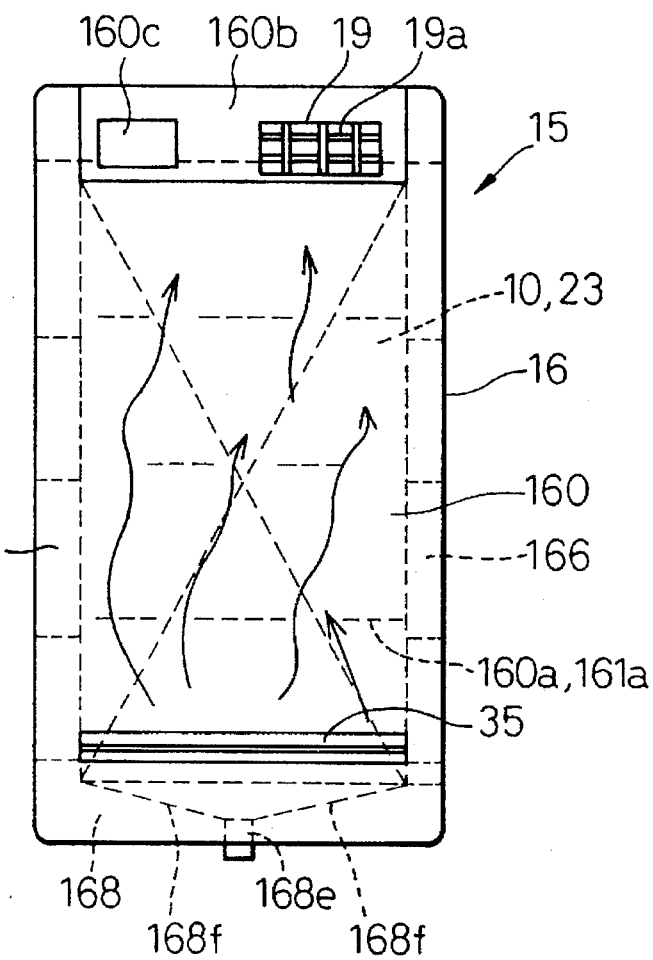
FIG. 3B is a front view of the cooling unit shown in FIG. 3A.

FIGS. 3A and 3B are views showing a state of assembly of the cooling unit 15 of the present invention. FIG. 4 is an exploded perspective view of the cooling unit 15. In an upper portion inside the case 16, there is formed an air path 20 communicated with the air blowing port 19. In this air path 20, there is provided a centrifugal blower 21 driven by a motor 21a. In a lower portion of this air path 20, a chamber 22 is defined for installing the cooler. In this chamber 22, there are provided a refrigerant evaporator 10 for regenerating heat and a heat regenerating material pack 23 which is cooled by this evaporator 10.

Figure 5:
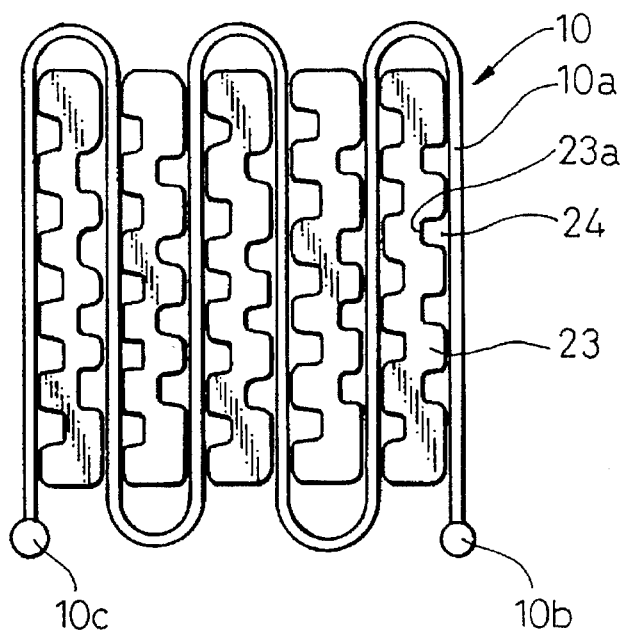
FIG. 5 is a front view of the heat regenerating evaporator and the heat regenerating pack which are assembled to the cooling unit.
Figure 6A:
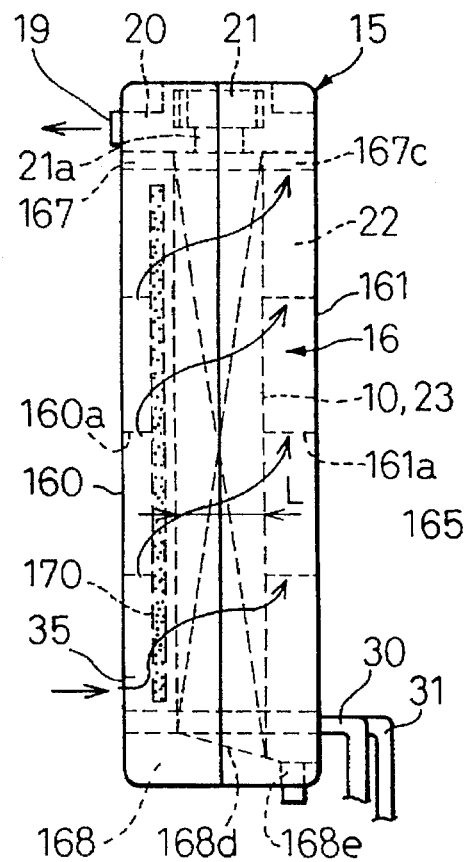
FIG. 6A is a side view of the cooling unit of the second embodiment.
Figure 6B:
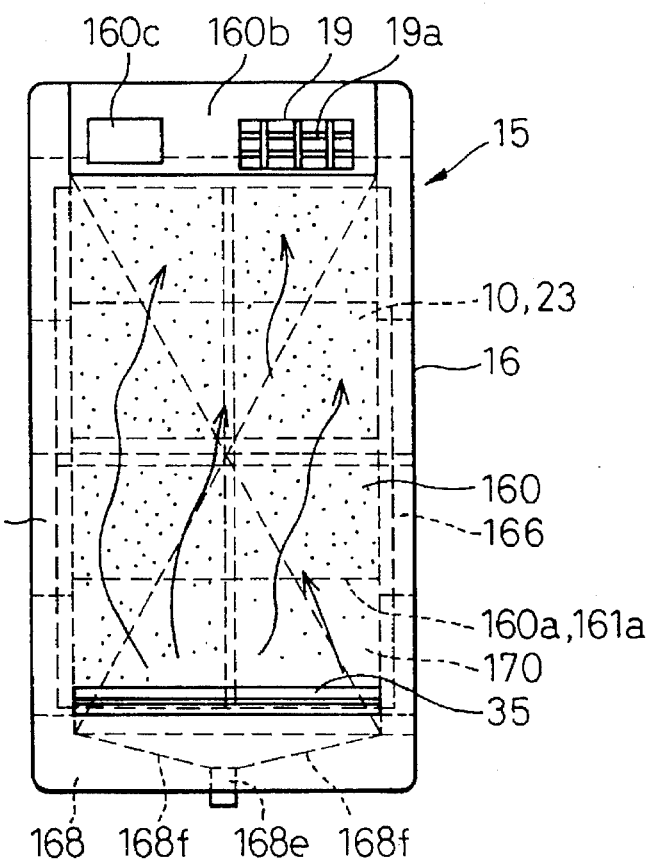
FIG. 6B is a front view of the cooling unit shown in FIG. 6A.

In this embodiment, the evaporator 10 is composed of a flat tube 10a made of aluminum plate having a large number of passages. This flat tube 10a is shown in FIGS. 4 and 5. The flat tube 10a is composed in such a manner that the section of the flat tube is flat and the width of the flat tube is the same as the width L (shown in FIGS. 3A and 3B and in FIG. 4) of the heat regenerating material pack 23. As is well known, in the flat tube, there are formed a large number of parallel passages through which the refrigerant passes. As illustrated in FIG. 5, the flat tube 10a is provided with bent portions at the upper and lower ends, so that the flat tube 10a snakes in the upward and downward direction. Consequently, the substantially parallel flat surface portions of the flat tube 10a lie in vertical planes.

In this connection, reference numerals 10b, 10c are pipes used for an inlet and an outlet of the refrigerant.

The heat regenerating material packs 23 are arranged between the adjacent flat surface portions of the flat tube 10a of the refrigerant evaporator 10 in such a manner that the packs 23 are closely contacted with the respective flat surface portions. As illustrated in FIG. 5, protrusions and recesses are formed in the heat regenerating material pack 23 in such a manner that the lengths of the protrusions and recesses are longer than the widths and they are disposed in the upward and downward direction. The pack 23 is composed of a thin bag-shaped member made of resin, and water or soft gel is charged in the pack.

In order to enhance the heat exchanging effectiveness between the pack 23 and the air blown by the blower, it is preferable to use polyethylene or nylon from which a thin sheet can be easily made. In FIG. 5, reference numeral 24 is an air path formed between the recess 23a of the heat regenerating material pack 23 and the flat tube 10a of the refrigerant evaporator 10. As illustrated in the drawing, there are provided a large number of air paths 24 arranged in parallel with each other in the horizontal direction. Arrows illustrated in FIGS. 3A, 3B show a state of an air current flowing into the case 16 from the sleeping area 14 through the suction port 35 disposed at the front lower portion of the case 16, and the air current passes through the above air paths 24 and flows to the rear upward portion of the case 16.

Next, referring to FIG. 4, the entire assembly structure of the cooling unit 15 will be explained as follows. The case 16 is divided into a front side case 160 made of resin and a rear side case 161 also made of resin. Both cases 160, 161 are combined into one body with screws 162. Inside the cases 160 and 161, there are provided heat insulating material members 163, 164 for enhancing the heat insulating property.

Inside the cases 160 and 161 made of resin, there are provided a plurality of ribs 160a, 161a (shown in FIG. 4) which are molded integrally with the cases 160 and 161. These ribs 160a, 161a are rectangular and extended in the horizontal direction. When a current of air passes in the air paths 24, it is guided by the ribs 160a, 160b. The ribs are disposed zigzag so that the current of air flowing from the suction port 35 to the heat regenerating material pack 23 can be uniformly dispersed.

In this case, the zigzag arrangement is defined as follows. When the rectangular ribs 160a, 161a extending in the horizontal direction are arranged multi-stepwise in the upward and downward direction, the plurality of ribs 160a, 161a are shifted in the horizontal direction with respect to each step as illustrated in FIG. 3B. In the heat insulating members 163, 164, there are formed slits 163a, 164a into which the ribs 160a, 161a can be inserted, that is, the ribs 160a, 161a can be protruded onto the side of the evaporator 10 for regenerating heat through these slits 163a, 164a.

In this embodiment, the width L of the heat regenerating material pack 23 is set to be slightly larger than the width of the flat tube 10a, and the front and the rear side of the heat regenerating material pack 23 are pressed against the ribs 160a, 161a, so that the heat regenerating material pack 23 is fixed into the case 16. Consequently, the ribs 160a, 161a have two functions. One is a function to guide a current of air, and the other is a function to fix the heat regenerating material pack 23.

In this case, the width L of the heat regenerating material pack 23 may be set to be substantially the same as the width of the flat tube 10a so that the ribs 160a, 161a can press both the heat regenerating material pack 23 and the front and the rear side of the flat tube 10a. In this way, the heat regenerating material pack 23 and the flat tube 10a may be fixed to the case 16 with respect to the longitudinal direction.

There are provided side plates 165, 166 made of resin on both sides of the evaporator 10 with respect to the transverse direction. Inside these side plates 165, 166, there are provided a plurality of recess portions 165a, 166a which form a plurality of air layers. These recess portions 165a, 166a are formed by partitioning the inside of the side plates in the upward and downward direction. Due to the plurality of air layers, the heat insulating effect can be enhanced. In this case, since the plurality of air layers are partitioned in the upward and downward direction, it is possible to prevent the natural convection of air so that the heat insulating effect can be further enhanced. Further, partition walls of the plurality of recess portions 165a, 166a reinforce the side plates 165, 166, so that the mechanical strength of the side plate 165, 166 can be enhanced.

There are formed female screws 165b, 166b on the side plates 165, 166. When the male screws 162 are set into the female screws 165b, 166b, both cases 160, 161 can be fastened, and the side plates 165, 166 can be fixed to both cases 160, 161.

On the upper side of the evaporator 10, there is provided an upper holding plate 167 made of resin which engages with the U-shaped upper bent portions of the flat tube 10a so that the flat tube 10a can be held. On the upper holding plate 167, there are provided reinforcement ribs 167b and a wave-shaped portion 167a engaging with the U-shaped bent portion of the flat tube 10a. In a portion of the upper holding plate 167 on the side of the rear case 161, there is provided a communicating hole 167c through which the upper portion of the chamber 22 is communicated with the suction side of the blower 21.

In an upper portion of the upper holding plate 167, there is provided a blower 21. This blower 21 includes: a motor 21a; a centrifugal blower 21b driven by this motor 21a; and a blower casing 21c forming the air path 20 which is a path of an air current blown out from the centrifugal blower 21b. At the outlet of the blower casing 21c, there is provided a blowing grill 19a of the blowing port 19.

In an upper portion of the front side case 160, there is provided an auxiliary plate 106b. The blowing port 19 opens onto this auxiliary plate 160b. On the side of this blowing port 19, there is provided a control panel 160c of the cooling unit 15. On this control panel 160c, there is provided a control switch for the blower 21.

On the lower side of the evaporator 10, there is provided a support plate 168 made of resin for supporting the lower U-shaped bent portion of the flat tube 10a. This support plate 168 includes: a wave-shaped portion 168a engaging with the U-shaped bent portion of the flat tube 10a; and reinforcement ribs 168b.

The support plate 168 is formed into a dish-shape having a recess portion in which drain water generated by the pack 23 in the process of cooling is stored. The wave-shape portion 168a is divided into 2 portions, and there is formed a groove 168c in the middle portion so that the drain water is allowed to flow in the groove 168c from the front side to the rear side of the case.

As illustrated in FIG. 3A, on the bottom face of the support plate 168, there is formed an inclined face 168d which is inclined from the front face to the rear face of the case so that the drain water is allowed to flow smoothly from the front face side to the rear face side of the case along the current of air. There is formed a drain water discharge port 168e at the lowermost portion of the inclined face 168d. On the bottom face of the support plate 168, there is formed an inclined face 168f (shown in FIG. 3B), the substantial center of which is the lowest with respect to the width direction of the case. The drain water discharge port 168e is disposed at the substantial center of the bottom face of the support plate 168 with respect to the width direction of the case 16.

On the upper portion of the wave-shaped portion 168a, there is provided a wave-shaped heat insulating member 169. The lower U-shaped bent portion of the flat tube 10a is engaged with and held by the wave-shaped portion 168a via this wave-shaped heat insulating member 169.

The evaporator 10 and the heat regenerating material pack 23 composing the cooling unit are arranged over substantially all the width of the case 16 (in the transverse direction of FIG. 3B). The suction port 35 is also arranged over substantially all the width of the case 16. Accordingly, heat exchange is conducted between a current of sucked air and the heat regenerating material pack 23 in substantially all the region with respect to the width direction of the case 16. Consequently, it is possible to increase the heat exchange area.

Next, the mode of operation of this embodiment will be explained as follows.

When an air-conditioner switch not shown in the drawing, is turned on while a truck is running (during the operation of an engine), the electromagnetic clutch 1a is energized with electric current, so that the compressor 1 is connected with the vehicle engine via the electromagnetic clutch 1a. Therefore, the compressor 1 is driven by the engine. In this way, the compressor 1 is operated.

When the compressor 1 is operated, the refrigerant is circulated in the refrigerating cycle shown in FIG. 1. Since the electromagnetic valve 4 is normally open, the refrigerant passes through the electromagnetic valve 4 and circulates in the refrigerant circuit 7 for air-conditioning. A current of air blown by the blower of the air-conditioning unit 13 is cooled and dehumidified by the evaporator 6 for air-conditioning, so that the truck driver's cabin 12 can be air-conditioned.

At this time, the constant pressure expansion valve 9 in the refrigerant circuit 8 for regenerating heat maintains a closed condition since the pressure in the downstream of the constant pressure expansion valve 9 is not lowered to a predetermined value (for example, in the case of the refrigerant R134a, at a pressure of 1.0 kg/cm$^2$, the evaporation temperature is −10° C.).

When a heat regenerating switch, not shown in the drawing, is turned on while the truck is running, an electrically energizing signal is inputted from the control circuit to the electromagnetic valve 4 at regular intervals, and the electromagnetic valve 4 is closed for a short period of time at regular intervals. Then, supply of the refrigerant to the refrigerant circuit for air-conditioning is stopped. Accordingly, by the suction of the compressor 1, the pressure in the refrigerant circuit for regenerating heat is suddenly lowered to a value not more than a predetermined pressure. Therefore, the constant pressure expansion valve 9 is opened. Since the constant pressure expansion valve 9 is intermittently opened for a short period of time, the cooling action of the evaporator 6 for air-conditioning is hardly affected.

When the constant pressure expansion valve 9 is intermittently opened and the refrigerant is supplied to the heat regenerating evaporator 10, the heat regenerating pack 23 is cooled by the heat regenerating evaporator 10, so that the heat regenerating material such as water in the heat regenerating pack 23 is frozen for regenerating heat. Around the heat regenerating evaporator 10, there are disposed heat insulating members 163, 164, 169. Further, on the side plates 165, 166, there are provided a plurality of recess portions 165a, 166a forming a plurality of heat insulating air layers which are divided in the upward and downward direction. Accordingly, heat in the heat regenerating evaporator 10 can be effectively insulated in the process of regenerating heat.

Due to the cooling action of the heat regenerating evaporator 10, the heat regenerating pack 23 is effectively cooled so that heat can be regenerated. During a period of time from the completion of cooling the heat regenerating material to the start of operation of air-conditioning in which heat is regenerated when the truck is parked, it is possible to effectively prevent the heat regenerating pack 23 from warming.

On the other hand, when the truck driver takes a nap in the sleeping area 14 while the truck is parked, he operates a speed control lever of the blower 21 mounted on the control panel 160c for air-conditioning the sleeping area, so that the blower 21 is set in motion while electric power is supplied to the blower motor from a battery mounted on the truck.

Then, air is sucked from the sleeping area 14 into the case 16 through the suction port 35 provided on the case 16 of the cooling unit 15. Therefore, a current of air flows in a path in the case 16 as shown by arrows in FIG. 3. When the current of air flows into the air path 24 formed between the heat regenerating pack 23 and the evaporator 10, heat is exchanged between the current of air and the heat regenerating pack 23, so that the current of air can be cooled. The thus cooled current of air passes through the communicating port 167c and the air path 20, and blows out from the blowing port 19 into the sleeping area 14. In this way, the sleeping area 14 can be air-conditioned.

While the truck is parked, it is possible to air-condition the sleeping area until the heat regenerating material in the heat regenerating pack 23 is completely liquidized or transformed into a gel state and the temperature is raised. Due to the heat insulating structure described before, it is possible to prevent the cooled air and the heat regenerating pack from being exposed to heat.

In this connection, according to the present invention, the cases 160, 161 are provided with the ribs 160a, 161a. By the action of these the ribs 160a, 161a, it is possible to allow a current of air to uniformly flow in the large number of air paths 24 formed between the heat regenerating pack 23 and the evaporator 10. As a result, the current of air blown out by the blower can be effectively cooled in all regions of the heat regenerating pack 23.

When the current of air is cooled by the heat regenerating pack 23, drain water (condensed water) is generated on the surfaces of the heat regenerating pack 23 and the tube 10a. Since the tube 10a of the evaporator 10 and the heat regenerating pack 23 are disposed in the upward and downward direction, drain water drops on the faces of the tube 10a and the heat regenerating pack 23 in the upward and downward direction. Then the dropping water gets onto the support plate 168.

As described before, this support plate 168 is formed into a dish-shape having a recess portion for receiving the drain water. The drain water passes through a groove 168c formed in the middle portion of the wave-form portion 168a which is divided into 2. In this way, the drain water flows from the front to the rear face side.

Further, on the bottom face of the support plate 168, there is formed an inclined face 168d which is inclined downward from the front face side of the case to the rear face side. Further, there is formed an inclined face 168f, the center of which is substantially the lowest with respect to the case width direction. Accordingly, the drain water smoothly flows from the front face side of the case to the rear face side along the current of air.

Since there is provided a drain water discharge port 168e at the lowest portion of the inclined faces 168d, 168f, the drain water can be smoothly discharged outside from the drain water discharge port 168e through a drain hose not shown in the drawing.

FIGS. 6A, 6B to FIG. 8 are views showing the second embodiment of the present invention. At a position close to the suction port 35 of the case 16, there is detachably provided an air purifying filter 170 for purifying a current of air flowing onto the front side of the heat regenerating pack 23 and the heat regenerating evaporator 10.

When the heat regenerating type cooling apparatus of the present invention is used over a long period of time, dust in the air, bacteria, cigarette smoke and others are deposited onto the surface of the heat regenerating evaporator 10. Due to the deposition, these members 10, 23 are corroded. Sometimes they produce an offensive odor.

In order to solve the above problems, in the second embodiment, the air purifying filter 170 is attached onto the front side of the heat regenerating pack 23 and the heat regenerating evaporator 10 so that the dust and offensive odor component can be removed. In this way, the occurrence of corrosion and offensive odor can be suppressed.

Figure 7A:
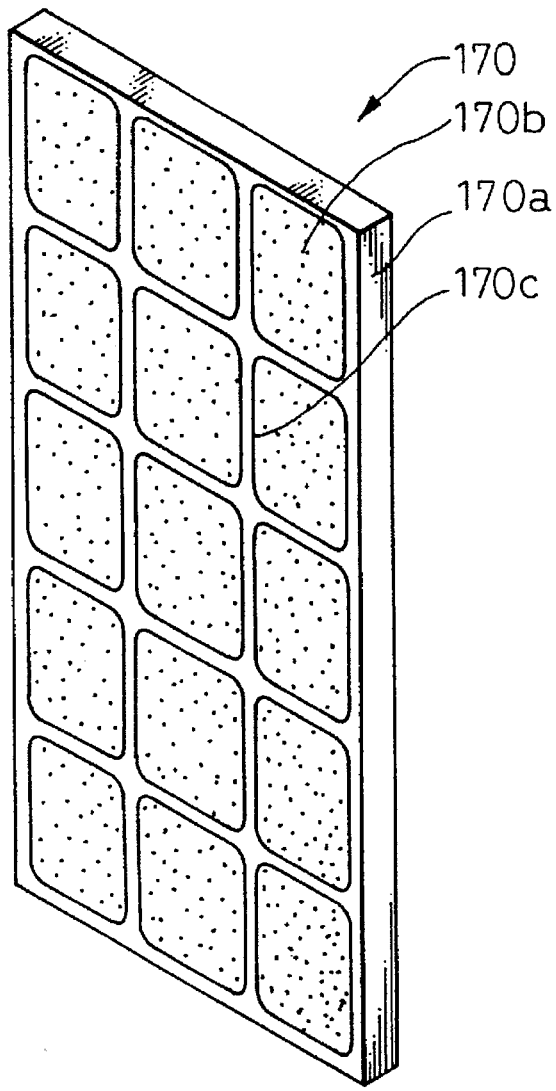
FIG. 7A is a perspective view of the air purifying filter used in the second embodiment.
Figure 7B:
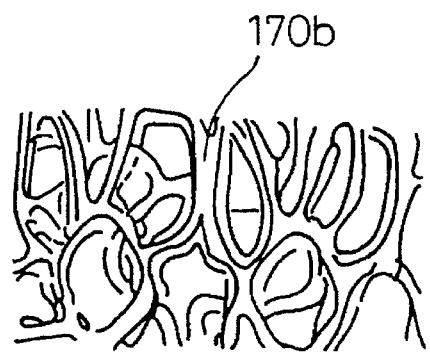
FIG. 7B is a partially enlarged view of the air purifying filter shown in FIG. 7A.

The structure of the second embodiment will be specifically explained below. As illustrated in FIG. 6, a rectangular air purifying filter 170 is used. The air purifying filter 170 is designed so that the front side of the heat regenerating pack 23 and the heat regenerating evaporator 10 can be entirely covered with the filter. FIG. 7A is a view showing a single body of the air purifying filter 170. The air purifying filter 170 has a rectangular frame 170a made of resin, which holds a filter member 170b.

For example, the filter member 170b is made of a three-dimensional net-shaped porous foaming resin such as polyurethane foam to which activated carbon particles of the deposition type are attached. By the action of activated carbon particles, the offensive odor component can be absorbed, and by the action of porous foaming resin, dust in the air can be removed. Examples of usable materials of the filter member 170b are: glass fiber paper, granular activated carbon, and electret. Alternatively, these materials may be combined.

In the frame 170a, there is integrally provided a crosspiece member 170c for holding the filter member 170b. After the filter member 170b has been held by this crosspiece member 170c, it is fixed onto the inside wall face of the frame body 170a by means of adhesion. In this embodiment, the crosspiece member 170c is provided only on one side of the frame body 170a which is at an upstream side of the air flow.

Figure 8:
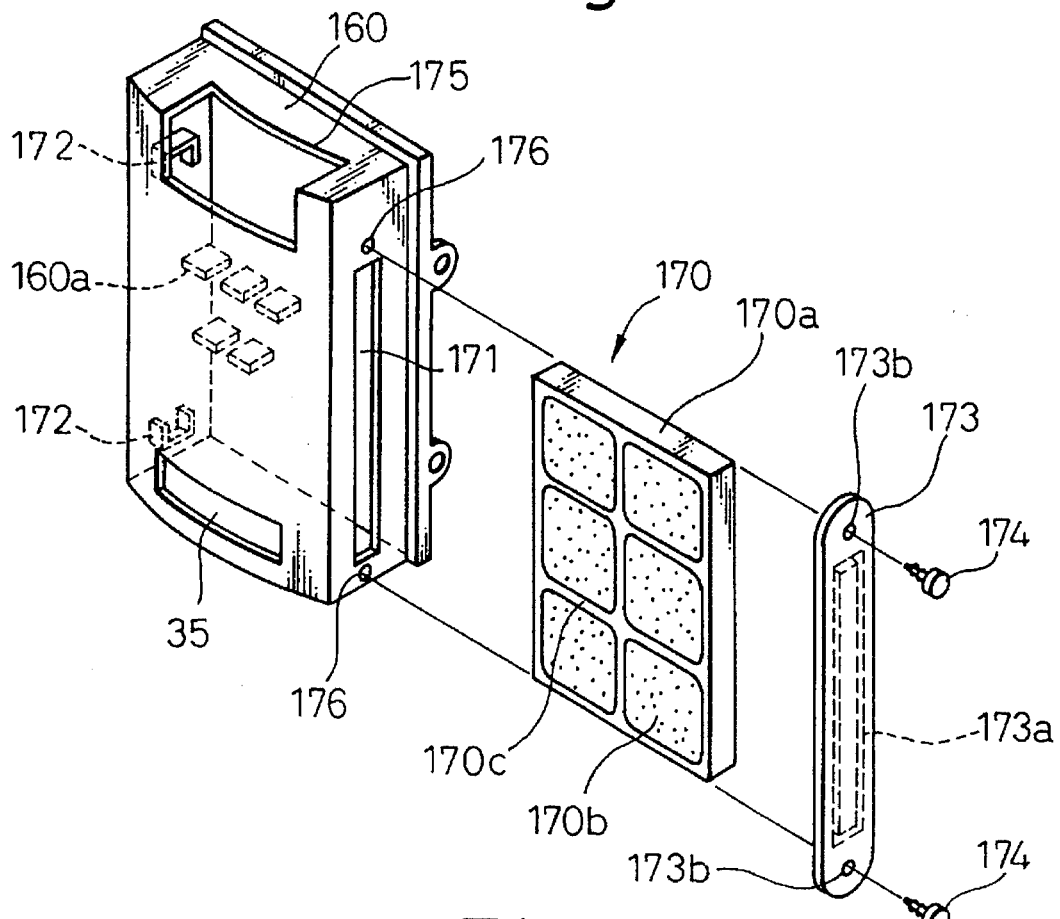
FIG. 8 is an exploded perspective view showing the installation structure of the air purifying filter used in the second embodiment.

FIG. 8 is a view showing the mounting structure of the air purifying filter 170. On one side wall of the front face side case 160, there is provided a filter insertion hole 171. The dimensions of the filter insertion hole 171 are determined so that the air purifying filter 170 can be inserted into the filter insertion hole 171. On the inside face of the other side wall of the front face side case 160, there are provided two U-shaped filter holding members. One is disposed at an upper position, and the other is disposed at a lower position. Upper and lower end portions of the frame body 170a of the air purifying filter 170 are engaged with these U-shaped filter holding members. These U-shaped filter holding members may be molded integrally with the front face side case 160, or alternatively they may be molded separately and then fixed onto the inside face of the case 160.

Reference numeral 173 is a filter mounting cover made of resin, which is a flat rectangular sheet as illustrated in the drawing. The length of the filter mounting cover 173 in the upward and downward direction is longer than the length of the filter insertion hole 171 in the upward and downward direction. On the inside wall of the filter mounting cover 173, there is integrally formed a rectangular protruding wall 173a with which the right side portion of the frame 170a of the air purifying filter 170 is engaged and held.

The air purifying filter 170 is inserted into the front face side case 160 through the filter insertion hole 171, and upper and lower end portions of the left side face of the frame body 170a are inserted into the U-shaped filter holding members 172, 172. In this way, the frame body 170a is held in the front face side case 160. After that, while the protruding wall 173a of the filter mounting cover 173 is engaged with the right side face of the frame body 170a, the filter mounting cover 173 is pressed against the outside portion of the filter insertion hole 171.

Next, screws 174 are engaged in the screw holes 176 on the front side case 160 through the screw insertion holes 173b formed on upper and lower portions of the filter mounting cover 173. In this way, the air purifying filter 170 can be detachably attached inside the front face side case 160.

Accordingly, when the purifying capacity of the air purifying filter 170, such as a dust removing capacity or a deodorizing capacity, is deteriorated, it is possible to remove the air purifying filter 170 from the front face side case 160 by removing the screws 174, so that the air purifying filter 170 can be easily replaced or cleaned.

Since the air purifying filter 170 is disposed on the front faces of the heat regenerating pack 23 and the heat regenerating evaporator 10 in this second embodiment, the ribs 160a provided on the front face side case 160 press the air purifying filter 170 against the heat regenerating pack 23 and the heat regenerating evaporator 10.

Referring to FIG. 8, reference numeral 175 is an opening for attaching the auxiliary plate 160b illustrated in FIG. 4.

Figure 9:
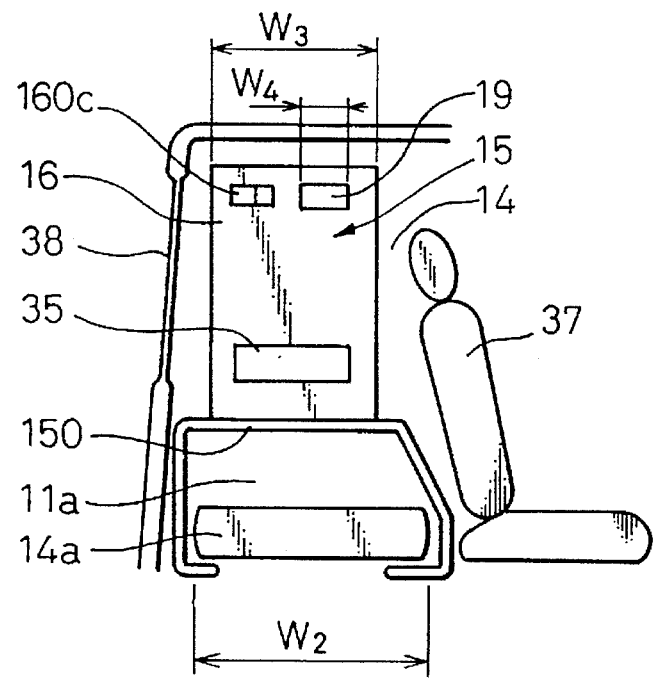
FIG. 9 is a front view showing the specific installation structure of the cooling unit 15.

FIGS. 9 and 10 are views showing an example in which the present invention is applied to the heat regenerating type cooling apparatus for air-conditioning a sleeping area of a truck. At the rear of the driver's cabin, there is formed a sleeping area 14 in which the bed 14a is provided. There is provided a cooling unit 15 on one side wall 18 of this sleeping area 14 with respect to the vehicle width direction.

The cooling unit 15 includes a thin rectangular parallelepiped case 16 which is longitudinally long. In a lower portion of this case 16, there is provided a suction port 35 through which air is sucked from the sleeping area 14. This suction port 35 is composed of a large number of small holes, which are formed in the substantially entire region on the front face with respect to the width direction.

In an upper portion of the case 16, there is provided a grill-shaped blowing port 19 from which a current of cold air is blown out toward the other side wall 36 with respect to the vehicle width direction (shown in FIG. 10). In order to maintain the wind speed at which the current of cold air reaches the head of the sleeping person A, the blowing port 19 is formed in a small region, the width of which is approximately ⅓ of the front face width of the cooling unit 15 so that the area of the opening can be reduced.

In an upper portion on the front face of the case 16, there is provided a control panel 160c for the cooling apparatus to air-condition the sleeping area. This control panel 160c is arranged adjacent to the blowing port 19. On this control panel 160c, there is provided an operation lever of the speed control switch of the blower.

FIGS. 9 and 10 are views showing an embodiment of the specific arrangement of the cooling unit 15 in the sleeping area 14. There is provided a stand 150 at a lower portion of one side wall 18 of the sleeping area 14 with respect to the vehicle width direction. This stand 150 is made of resin or a metal sheet such as a steel sheet and formed into a gate-shape and fixed to the vehicle body by an appropriate fixing means.

Since the stand 150 is formed into a gate-shape, there is formed a chamber 11a into which an end portion of the bed 14a and the feet of the sleeping person can be inserted. The cooling unit 15 is mounted on an upper face of this stand 150.

In this connection, reference numeral 37 is a passenger's seat, and reference numeral 38 is a window.

When the truck driver sleeps in the sleeping area 14 while the truck is parked, he operates a control lever (not shown) of the blower mounted on the control panel 160c for air-conditioning the sleeping area, so that the blower is set in motion while electric power is supplied to the blower motor from a battery mounted on the truck. Then, a current of cold air is generated in the cooling unit 15. This current of cold air is blown out from the blowing port 19 into the sleeping area 14, so that the sleeping area 14 can be air-conditioned.

While the truck is parked, it is possible to air-condition the sleeping area until the heat regenerating material in the heat regenerating pack accommodated in the cooling unit 15 is completely liquidized or transformed into a gel state and the temperature is raised.

According to the present invention, when the sleeping area 14 is air-conditioned, it is possible to conduct air-conditioning to give a sleeping person A a comfortable feeling by improving the condition of the cold air current which blows out from the blowing port. Improvements in the condition of the cold air current which blows out from the blowing port will be described in detail below.

As illustrated in FIG. 10, the cooling unit 15 is arranged by one side wall 18 of the sleeping area 14, and the blowing port 19, which is open toward the other side wall 36, is arranged in an upper portion of the cooling unit 18. Accordingly, a current of cold air is blown out from this blowing port 19 toward the other side wall 36 with respect to the vehicle width direction, and the current of cold air can reach a position close to the head of the sleeping person A as indicated by arrow "Y" in the drawing. As a result, the upper half of the body of the sleeping person A can be effectively exposed to air-conditioned air.

Since the suction port 35 is provided in a lower portion of the cooling unit 15, it is possible to generate a current of air which is directed from the upper half of the body of the sleeping person A to the suction port 35 past the lower half of the body (shown by arrow "Z" in FIG. 10).

Consequently, the upper half of the body of the sleeping person A can be effectively exposed to air-conditioned air. Further, the overall body from the upper to the lower half can be exposed to a uniform current of cold air. Therefore, the sleeping person A is given a comfortable feeling of air-conditioning.

FIG. 11 shows a result of the experiment of the cooling apparatus of the present invention. Dimensions of the apparatus used for the experiment are described below with reference to FIGS. 9 and 10. W1=2000 to 2200 mm, W2=500 to 600 mm, W3=350 mm, W4=120 mm, W5=185 mm, H1=1000 mm, H2=300 mm, H3=560 mm, H4=400 mm, H5=40 mm, H6=700 mm, and H7=60 mm.

In the experiment made by the inventors, the sleeping area 14 was air-conditioned as follows. Water was used as the heat regenerating material accommodated in the heat regenerating pack of the cooling unit 15. This water was frozen and the temperature was lowered to −5° C. Under the above condition, a current of air, the quantity of which was 40 $m^3/h$, was sent by the blower 9, and the wind speed was set at 9 m/s at the blowing port 19. When the air-conditioning operation was conducted under the above condition, the sleeping area 14 was air-conditioned. In this case, the wind speed distribution is shown in FIG. 11A, and the temperature distribution is shown in FIG. 11B.

Figure 11A:
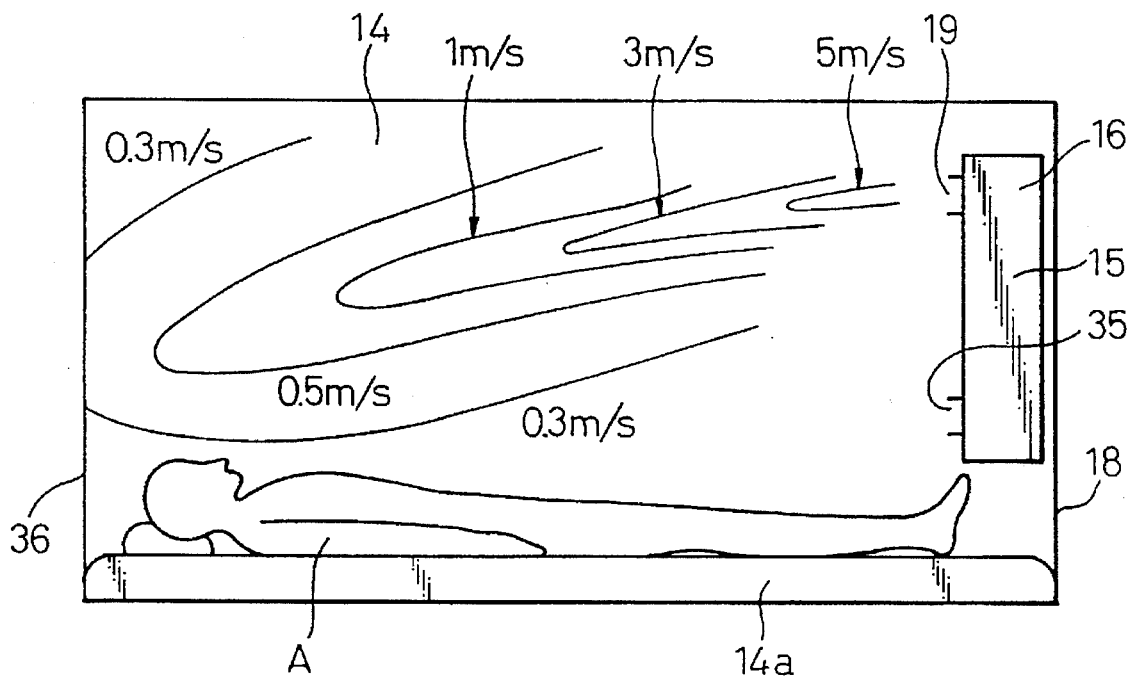
FIG. 11A is a schematic illustration showing a result of the experiment of the apparatus of the present invention.

As can be seen in FIG. 11A, it was possible to allow a current of cold air to reach the head of the sleeping person A, and further the wind speed was not more than 0.2 m/s at a position close to the head. That is, a current of cold air was sent to the sleeping person at an appropriate flow speed, so that he always feels comfortable.

Figure 11B:
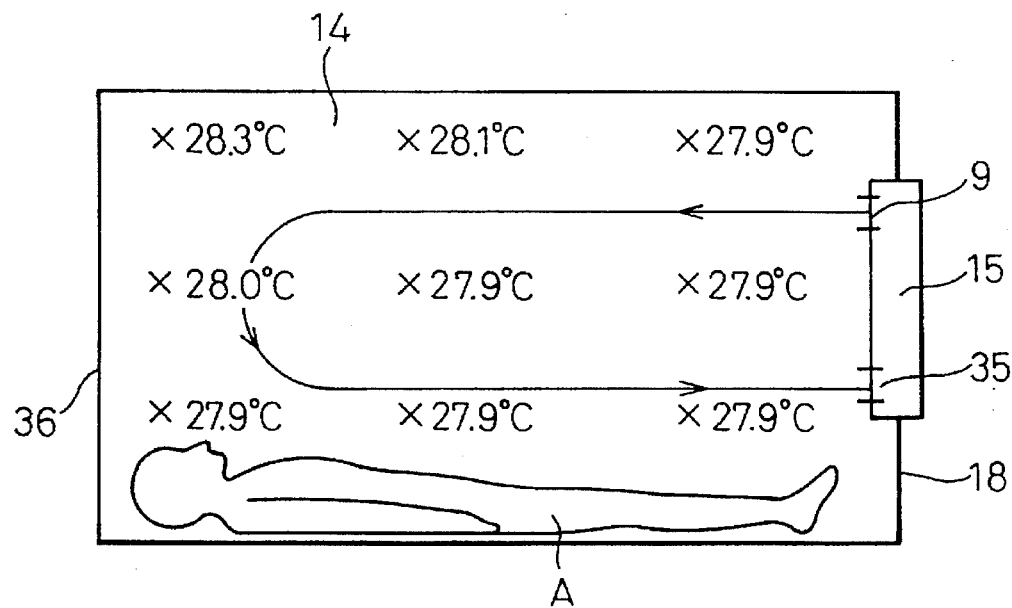
FIG. 11B is a schematic illustration showing a result of an experiment on the apparatus of the present invention.

As shown in FIG. 11B, the temperature distribution from the upper to the lower half of the body of the sleeping person A was uniform at 27.6° C. From this viewpoint, the sleeping person A was given a comfortable feeling of air-conditioning.

In this connection, it should be noted that the present invention is not limited to the specific embodiment described above, but variations may be made by one skilled in the art. For example, the present invention can be applied to not only a truck but also a single-compartment vehicle in which the cooling apparatus of the invention is installed at the rear of a cabin so that the cabin can be air-conditioned while the single-compartment vehicle is parked under the condition that the engine is stopped.

In the apparatus of the invention, the evaporator 10 is composed in such a manner that the flat tube 10a bends and snakes in the upward and downward direction, however, the present invention is not limited to the above structure. For example, the following structure may be adopted. A large number of linear flat tubes 10a are arranged in parallel to each other, and both ends of the flat tubes 10a are connected with an inlet tank and an outlet tank of the refrigerant. That is, a multi-flow type evaporator may be used.

In the above embodiment of the invention, the heat regenerating pack 23 is pressed and fixed by the ribs 160a, 161a, however, the heat regenerating pack 23 may be fixed to the flat tube 10a of the evaporator 10 by means of adhesion.

In the above embodiment, the ribs 160a, 161a are arranged on both sides of the upstream and the downstream of an air current with respect to the heat regenerating pack 23 and the evaporator 10. However, a form of the air current flowing in the air path 24 of the heat regenerating pack 23 can be variously adjusted by selecting the arrangement, size and shape of the ribs 160a, 161a. Accordingly, when these components are appropriately selected, the ribs 160a, 161a may be arranged in one of the upstream and the downstream sides of the air current of the heat regenerating pack 23 and the evaporator 10.

In the above embodiment, the upper U-shaped bent portion of the evaporator 10 is directly engaged with the upper holding plate 167. However, the same wave-shaped insulating member as the insulating member 169 may be interposed between the evaporator 10 and the upper holding plate 167 so that the heat insulating property can be enhanced.

In the second embodiment, the size of the air purifying filter 170 may be made to be the same as that of the suction port 18, and the air purifying filter 170 may be provided only downstream of the suction port 18.

According to the present invention, a current of air blown by the blower is guided by the ribs. Therefore, the current of air can be uniformly sent into the air path of the pack-shaped member in which the heat regenerating material is accommodated. Accordingly, the cooling effect of the heat regenerating member can be enhanced.

According to the present invention, the ribs are arranged on both the upstream and the downstream of an air current with respect to the pack-shaped member. Also according to the present invention, the ribs are arranged zigzag. Due to the foregoing, the cooling ability of the heat regenerating material can be further enhanced.

According to the present invention, the ribs are also provided with a function of pressing the pack-shaped member against the inside of the case. Accordingly, the cooling ability can be enhanced and the pack-shaped member can be fixed by the simple structure.

According to the present invention, the case is molded of resin, and the ribs are also molded integrally with the case. Therefore, it is possible to manufacture the ribs at low cost.

According to the present invention, there is provided a member for forming a heat insulating air layer around the heat regenerator. Therefore, the heat regenerator can be effectively thermally insulated. Consequently, the pack-shaped member can be effectively cooled in the process of heat regeneration. Further, the cooled pack-shaped member can be effectively maintained in a cooled condition.

Accordingly, it is possible to shorten the heat regenerating time, and also it is possible to extend a period of time of air-conditioning conducted by the heat regenerating material.

According to the present invention, there is detachably provided an air purifying filter for purifying a current of air flowing onto the front faces of the pack-shaped member and the heat regenerator at a position close to the suction port of the case. Therefore, it is possible to remove dust and an offensive odor component from a current of air by the air purifying filter. Accordingly, the dust and the offensive odor component are not deposited on the surfaces of the pack-shaped member and the heat regenerator, so that the occurrence of corrosion and an offensive odor can be effectively suppressed.

Finally, it should be understood that many modifications and variations will occur to a person skilled in the art without departing from the spirit and scope of the accompanying claims.

We claim:

1. A heat regenerating type cooling apparatus for generating a current of cold air blown into an objective cooling area, including:

a pack-shaped member accommodating therein heat regenerating material;

a heat regenerator having a tube in which refrigerant is circulated, said pack-shaped member being in close contact with a surface of said tube of said heat regenerator so as to be cooled by said heat regenerator; and air blowing means for generating a current of air to be cooled by said pack-shaped member and formed into said current of cold air discharged toward said objective cooling area;

wherein said pack-shaped member is provided with a surface having a recess formed therein, said recess and said surface of said tube of said heat regenerator defining an air path therebetween, and wherein said air blowing means causes said current of air to flow through said air path to be cooled by said pack-shaped member before said current of air is blown into said objective cooling area as said current of cold air.

2. The apparatus according to claim 1, further comprising a plurality of ribs defining guide means for guiding air, said ribs being arranged at least in one of an upstream and a downstream of said current of air flowing by said pack-shaped member, wherein said plurality of ribs are dispersedly arranged so that said current of air is uniformly dispersed when it is flowing toward said pack-shaped member.

3. The apparatus according to claim 1, further comprising:

a case for accommodating therein said pack-shaped member, said heat regenerator, said air path and said air blowing means;

an air suction port, arranged on said case, from which said current of air flows into said air path;

an air blowing port, arranged on said case, through which cool air cooled by said pack-shaped member is blown out from said air path to said objective cooling area to be cooled; and a plurality of ribs for guiding air, said ribs being arranged at least in one of an upstream and a downstream of said current of air flowing by said pack-shaped member, wherein said plurality of ribs are dispersedly arranged so that said current of air flowing from said air suction port to said pack-shaped member is uniformly dispersed.

4. The apparatus according to claim 1, wherein said objective cooling area is a sleeping area provided for a vehicle for allowing a vehicle driver to sleep therein, said sleeping area having first and second side walls, said heat regenerating type cooling apparatus further comprising:

a cooling unit including a case incorporating therein said pack-shaped member accommodating said heat regenerating material, said heat regenerator, and said air blowing means, said cooling unit being arranged on said first side wall of said sleeping area with respect to a vehicle width direction;

an air suction port for sucking air from said sleeping area, said air suction port being arranged in a lower portion of said cooling unit; and an air blowing port for blowing said current of cold air cooled by said pack-shaped member, to said second side wall of said sleeping area with respect to the vehicle width direction.

5. The apparatus according to claim 4, further comprising a stand arranged in a lower portion of said first side wall of said sleeping area with respect to the vehicle width direction, wherein said stand defines a space for accommodating feet of a sleeping person, and said cooling unit is mounted on said stand.

6. The apparatus according to claim 4, wherein said air suction port is formed over an entire width of a front face of said cooling unit, and said air blowing port is formed in a small region of about ⅓ of the width of said front face of said cooling unit.

7. The apparatus according to claim 2, wherein said ribs are arranged on both upstream and downstream sides of said pack-shaped member with respect to a direction of air flow.

8. The apparatus according to claim 3, wherein said ribs are arranged on both upstream and downstream sides of said pack-shaped member with respect to a direction of air flow.

9. The apparatus according to claim 3, wherein said ribs hold at least said pack-shaped member to retain the same in said case.

10. The apparatus according to claim 2, wherein said ribs are arranged zigzag with respect to said air path.

11. The apparatus according to claim 3, wherein said ribs are arranged zigzag with respect to said air path.

12. The apparatus according to claim 7, wherein said ribs are arranged zigzag with respect to said air path.

13. The apparatus according to claim 8, wherein said ribs are arranged zigzag with respect to said air path.

14. The apparatus according to claim 9, wherein said ribs are arranged zigzag with respect to said air path.

15. The apparatus according to claim 3, wherein said case is molded of resin and said ribs are formed integrally with said case.

16. The apparatus according to claim 9, wherein said case is molded of resin and said ribs are formed integrally with said case.

17. The apparatus according to any of claims 1, 3, 8, 9, 11, 13, 14, 15, or 16, wherein a member forming an insulating air layer is arranged around said heat regenerator.

18. The apparatus according to any of claims 2, 7, 10, or 12, wherein a member forming an insulating air layer is arranged around said heat regenerator.

19. The apparatus according to claim 3, wherein an air purifying filter for purifying air flowing onto a front side of said pack-shaped member and said heat regenerator is detachably arranged close to said air suction port of said case.

20. The apparatus according to claim 9, wherein an air purifying filter for purifying air flowing onto said front side of said pack-shaped member and said a regenerator is detachably arranged close to said air suction port of said case.

21. The apparatus according to claim 15, wherein an air purifying filter for purifying air flowing onto a front side of said pack-shaped member and said heat regenerator is detachably arranged close to said air suction port of said case.

22. The apparatus according to claim 16, wherein an air purifying filter for purifying air flowing onto a front side of said pack-shaped member and said heat regenerator is detachably arranged close to said air section port of said case.

23. The heat regenerating type cooling apparatus according to claim 18, wherein said air purifying filter is large enough to cover said from side of said pack-shaped member and said heat regenerator, and wherein said air purifying filter is detachably attached to an inside portion of said case through a filter insertion hole formed in one side of said case.

24. The apparatus according to claim 20, wherein said air purifying filter is large enough to cover said front side of said pack-shaped member and said heat regenerator, and wherein said air purifying filter is detachably attached to an inside portion of said case through a filter insertion hole formed in one side of said case.

25. The apparatus according to claim 21, wherein said air purifying filter is large enough to cover said front side of said pack-shaped member and said heat regenerator, and wherein said air purifying filter is detachably attached to an inside portion of said case through a filter insertion hole formed in one side of said case.

26. The apparatus according to claim 22, wherein said air purifying filter is large enough to cover said front side of said pack-shaped member and said heat regenerator, and wherein said air purifying filter is detachably attached to an inside portion of said case through a filter insertion hole formed in one side of said case.

27. The apparatus according to one of claims 3, 8, 9, 11, 13, 14, 15, 16, 19, 20, 21, 22, 24, 25, or 26, wherein said case is arranged in a vehicle's cabin at a predetermined region that is cooled by said current of cold air blown out from said air blowing port.

28. The apparatus according to claim 17, wherein said case is arranged in a vehicle's cabin at a predetermined region that is cooled by said current of cold air blown out from said air blowing port.

29. The apparatus according to claim 1, wherein said pack-shaped member, said heat generator, and said air blowing means are accommodated in a casing to thereby form a cooling unit arranged in said objective cooling area, and wherein said apparatus further comprises a stand arranged in said objective cooling area to mount thereon said cooling unit, an air suction port formed over an entire width of a front face of said cooling unit, and an air blowing port formed in a small region of said front face of said cooling unit, said casing of said cooling unit being molded of resin and accommodating therein an air purifying filter arranged so as to cover a front side of said pack-shaped member and said heat generator of said cooling unit, said air purifying filter being detachably attached to an inside portion of said casing through a filter insertion hole formed in a side of said casing.

30. A heat regenerating type cooling apparatus for air-conditioning a confined sleeping area provided in a vehicle to permit a vehicle drive to sleep therein, said apparatus comprising:

a cooling unit having a case containing therein cooling means, said cooling means including:
a pack-shaped member accommodating heat regenerating material;
a heat regenerator having a tube in which refrigerant is circulated, said pack-shaped member being in close contact with a surface of said tube so as to cool said pack-shaped member;
an air path formed in said pack-shaped member so that heat can be exchanged between air and said pack-shaped member;
air blowing means for blowing air into said air path;
an air suction port arranged in a lower portion of said case of said cooling unit through which a current of air sucked from said sleeping area flows into said air path;
an air blowing port arranged on said case, through which cool air cooled by said pack-shaped member is blown out from said air path into said sleeping area; and
a plurality of ribs for guiding air, said ribs being arranged at least in one of an upstream and a downstream of said air current flowing in said pack-shaped member, and dispersedly arranged so that said air current flowing from said air suction port to said pack-shaped member can be uniformly dispersed;

said apparatus further comprising a stand arranged in a lower portion of one side wall of said sleeping area with respect to the vehicle width direction, said stand defining a space for accommodating an end of a bed and also accommodating the feet of a sleeping person, and said cooling unit being mounted on said stand.

31. The apparatus according to claim 30, wherein said air suction port is formed over an entire width of a front face of said cooling unit, and said air blowing port is formed in a small region of about ⅓ of the width of said front face of said cooling unit.

32. The apparatus according to claim 30, wherein said case of said cooling unit is molded of resin and said ribs are formed integrally with said case.

33. The apparatus according to claim 32, wherein a member forming an insulating air layer is arranged around said heat regenerator.

34. The apparatus according to claim 32, wherein an air purifying filter for purifying air flowing onto a front side of said pack-shaped member and said heat regenerator is detachably arranged close to said air suction port of said case.

35. The apparatus according to claim 34, wherein said air purifying filter is large enough to cover said front side of said pack-shaped member and said heat regenerator, and said air purifying filter is detachably attached to an inside portion of said case through a filter insertion hole formed in a side of said case.

36. A heat regenerating type cooling apparatus for air-conditioning a confined sleeping area provided in a vehicle to permit a vehicle driver to sleep therein, said apparatus comprising:

a cooling unit having a case containing therein cooling means, said cooling means including:
a pack-shaped member accommodating heat regenerating material;
a heat regenerator having a tube in which refrigerant is circulated, said pack-shaped member being in close contact with a surface of said tube so as to cool said pack-shaped member;
an air path formed in said pack-shaped member so that heat can be exchanged between air and said pack-shaped member;
air blowing means for blowing air into said air path;
an air suction port arranged in a lower portion of said case of said cooling unit and permitting a current of air sucked from said sleeping area to flow therethrough into said air path, said air suction port being formed over an entire width of a front face of said cooling unit;
an air blowing port arranged in said case for permitting therethrough said current of air after being cooled by said pack-shaped member to be blown out from said air path into said sleeping area, said air blowing port being formed in a small region of about ⅓ of the width of said from face of said cooling unit; and
a plurality of ribs for guiding air, said ribs being arranged at least in one of an upstream and a downstream of an air current flowing in said pack-shaped member and dispersedly arranged so that said air current flowing from said air suction port to said pack-shaped member can be uniformly dispersed.

37. The apparatus according to claim 36, wherein said case of said cooling unit is molded of resin and said ribs are formed integrally with said case.

38. The apparatus according to claim 37, wherein a member forming an insulating air layer is arranged around said heat regenerator.

39. The apparatus according to claim 37, wherein an air purifying filter for purifying air flowing onto a front side of said pack-shaped member and said heat regenerator is detachably arranged close to said air suction port of said case.

40. The apparatus according to claim 39, wherein said air purifying filter is large enough to cover said front side of said pack-shaped member and said heat regenerator, and said air purifying filter is detachably attached to an inside portion of said case through a filter insertion hole formed in the side of said case.

41. A heat regenerating type cooling apparatus for air-conditioning a confined objective area comprising:

a pack-shaped member accommodating heat regenerating material;
a heat regenerator having a tube in which refrigerant is circulated, said pack-shaped member being in close contact with a surface of said tube so as to cool said pack-shaped member;
an air path formed in said pack-shaped member so that heat can be exchanged between air and said pack-shaped member;
air blowing means for blowing air into said air path;
a case for accommodating said pack-shaped member, heat regenerator, air path and air blowing means, said casing being molded of resin;

an air suction port arranged on said case, from which cool air cooled by said pack-shaped member is blown out from said air path to an object to be cooled; and a plurality of ribs for guiding air, said ribs being formed integrally with said casing and arranged at least in one of an upstream and a downstream of an air current flowing in said pack-shaped member, wherein said plurality of ribs are dispersedly arranged so that said air current flowing from said air suction port to said pack-shaped member can be uniformly dispersed.

42. The apparatus according to claim 41, wherein said air suction port is formed over the entire width of a front face of said cooling unit, and said air blowing port is formed in a small region of about ⅓ of the width of said front face of said cooling unit.

43. The apparatus according to claim 41, wherein a member forming an insulating air layer is arranged around said heat regenerator.

44. The apparatus according to claim 41, wherein an air purifying filter for purifying air flowing onto a front side of said pack-shaped member and said heat regenerator is detachably arranged close to said air suction port of said case.

45. The apparatus according to claim 44, wherein said air purifying filter is large enough to cover said front side of said pack-shaped member and said heat regenerator, and said air purifying filter is detachably attached to an inside portion of said case through a filter insertion hole formed in a side of said case.

46. A heat regenerating type cooling apparatus for air-conditioning a confined objective area comprising:

a pack-shaped member accommodating heat regenerating material;

a heat regenerator having a tube in which refrigerant is circulated, said pack-shaped member being in close contact with a surface of said tube so as to cool said pack-shaped member;

an air path formed in said pack-shaped member so that heat can be exchanged between air and said pack-shaped member;

air blowing means for blowing air into said air path;

a case for accommodating said pack-shaped member, heat regenerator, air path and air blowing means, said case being molded of resin;

an air suction port, arranged on said case from which a current of air flows into said air path;

an air blowing port, arranged on said case, through which cool air cooled by said pack-shaped member is blown out from said air path to an object to be cooled;

a plurality of ribs for guiding air, said ribs being formed integrally with said case and arranged at least in one of an upstream and a downstream of an air current flowing in said pack-shaped member, wherein said plurality of ribs is dispersedly arranged so that said air current flowing from said air suction port to said pack-shaped member can be uniformly dispersed, and a member forming an insulating air layer and arranged around said heat regenerator.

47. The apparatus according to claim 46, wherein an air purifying filter for purifying air flowing onto a front side of said pack-shaped member and said heat regenerator is detachably arranged close to said air suction port of said case.

48. The apparatus according to claim 47, wherein said air purifying filter is large enough to cover said front side of said pack-shaped member and said heat regenerator and said air purifying filter is detachably attached to an inside portion of said case through a filter insertion hole formed in a side of said casing.

49. A heat regenerating type cooling apparatus for air-conditioning a confined objective area comprising:

a pack-shaped member accommodating heat regenerating material;

a heat regenerator having a tube in which refrigerant is circulated, said pack-shaped member being in close contact with a surface of said tube so as to cool said pack-shaped member;

an air path formed in said pack-shaped member so that heat can be exchanged between air and said pack-shaped member;

air blowing means for blowing air into said air path;

a case for accommodating said pack-shaped member, heat regenerator, air path and air blowing means, said case being molded of resin;

an air suction port, arranged on said case from which a current of air flows into said air path; said heat regenerator being detachably arranged close to said air suction port of said case;

an air blowing port arranged on said case, through which cool air cooled by said pack-shaped member is blown out from said air path to an object to be cooled;

a plurality of ribs for guiding air, said ribs being formed integrally with said case and arranged at least in one of an upstream and a downstream of an air current flowing in said pack-shaped member, wherein said plurality of ribs is dispersedly arranged so that said air current flowing from said air suction port to said pack-shaped member can be uniformly dispersed, and an air purifying filter for purifying air flowing onto a front side of said pack-shaped member.

50. The apparatus according to claim 49, wherein said air purifying filter is large enough to cover said front side of said pack-shaped member and said heat regenerator, and is detachably attached to an inside portion of said case through a filter insertion hole formed in a side of said casing.

51. A heat regenerating type cooling apparatus for air-conditioning a confined objective area comprising:

a pack-shaped member accommodating heat regenerating material;

a heat regenerator having a tube in which refrigerant is circulated, said pack-shaped member being in close contact with a surface of said tube so as to cool said pack-shaped member;

an air path formed in said pack-shaped member so that heat can be exchanged between air and said pack-shaped member;

air blowing means for blowing air into said air path;

a case for accommodating said pack-shaped member, heat regenerator, air path and air blowing means, said case being molded of resin;

an air suction port, arranged on said case from which a current of air flows into said air path; said heat regenerator being detachably arranged close to said air suction port of said case;

an air blowing port arranged on said case, through which cool air cooled by said pack-shaped member is blown out from said air path to an object to be cooled;

a plurality of ribs for guiding air, said ribs being formed integrally with said case and arranged at least in one of an upstream and a downstream of an air current flowing in said pack-shaped member, wherein said plurality of ribs is dispersedly arranged so that said air current flowing from said air suction port to said pack-shaped member can be uniformly dispersed, and an air purifying filter for purifying air flowing onto a front side of said pack-shaped member, said air purifying filter being large enough to cover said front side of said pack-shaped member and said heat regenerator and detachably attached to an inside portion of said case through a filter insertion hole formed in a side of said case.

52. The apparatus according to claim 51, wherein a member forming an insulating air layer is arranged around said heat regenerator.

53. The apparatus according to claim 51, wherein said casing is molded of rein and said ribs are formed integrally with said case.

54. A heat regenerating type cooling apparatus for generating a current of cold air to be blown into an area to be cooled, said apparatus comprising:

a container member containing therein a heat regenerating material, said container member having a recess formed on an outer surface thereof;

a heat regenerator having a tube in which refrigerant is circulated, said container member being disposed in close contact with a surface of said tube of said heat regenerator so as to be cooled by said heat regenerator, said recess of said container member and said surface of said tube of said heat regenerator defining an air path therebetween; and a blower constructed and arranged to generate a current of air to flow through said air path and be cooled by said container member, the cooled current of air being discharged as the current of cold air into the area to be cooled.

55. The apparatus of claim 54 wherein said blower comprises:

a motor;

a centrifugal fan driven by said motor; and a blower casing housing said centrifugal fan and defining an air plenum therearound.

56. A heat regenerating type cooling apparatus for air-conditioning a confined area in a vehicle, said apparatus comprising:

a cooling unit comprising:

a case:

a container member which contains a heat regenerating material;

a heat regenerator having a tube in which refrigerant is circulated, said container member being disposed in close contact with an outer surface of said tube to facilitate heat exchange between said outer surface and said heat regenerating material in said container so that said pack-shaped member is cooled by said tube, an outer surface of said container member and said outer surface of said tube defining an air path therebetween, said container member and said heat regenerator being housed in said case;

a blower constructed and arranged to generate a current of air to flow through said air space and be cooled by said container member;

an air suction port constructed and arranged in a lower portion of said case of said cooling unit to permit air sucked from the confined area by said blower to flow therethrough into said air path, said air suction port being formed over an entire width of a front face of said cooling unit;

an air blowing port constructed and arranged in said case to permit said current of air cooled by said container member to be blown therethrough into said confined area, said air blowing port being formed in a small region of about ⅓ of the width of said front face of said cooling unit; and a plurality of ribs for guiding said current of air generated by said blower, said ribs being arranged in at least one of an upstream and a downstream of said air current flowing through said air path and being dispersedly arranged so that the air current flowing from said air suction port toward said container member is uniformly dispersed.

57. The apparatus of claim 56 wherein said blower comprises:

a motor;

a centrifugal fan driven by said motor; and a blower casing housing said centrifugal fan and defining an air plenum therearound.

58. The apparatus of claim 56 wherein said plurality of ribs are integrally formed with said case.

59. The apparatus of claim 56 further comprising a member forming an insulating air layer and arranged around said heat regenerator.

60. The apparatus of claim 56 wherein said case is formed of molded of resin.

61. The apparatus of claim 56 further comprising an air purifying filter for purifying air flowing onto a front side of said pack-shaped member, said air purifying filter being large enough to cover said front side of said pack-shaped member and said heat regenerator and being detachably attached to an inside portion of said case through a filter insertion hole formed in a side of said case.

* * * * *